March 29, 1932.    O. A. KRENKE    1,851,674
MEANS FOR MOUNTING ROTATABLE BODIES
Filed May 28, 1930
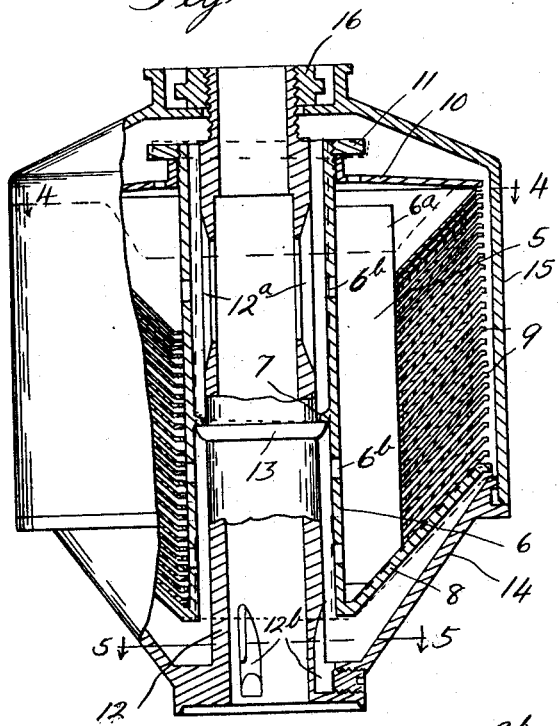
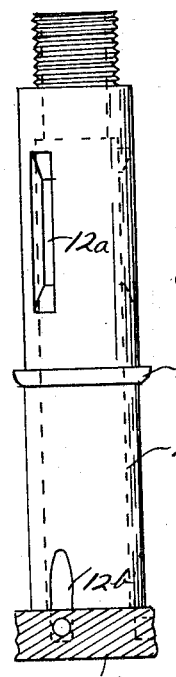
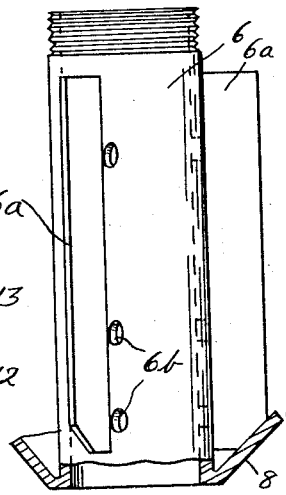
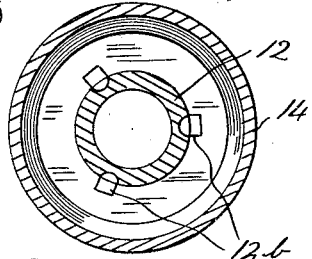
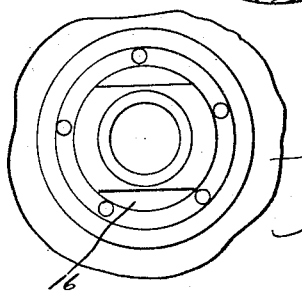
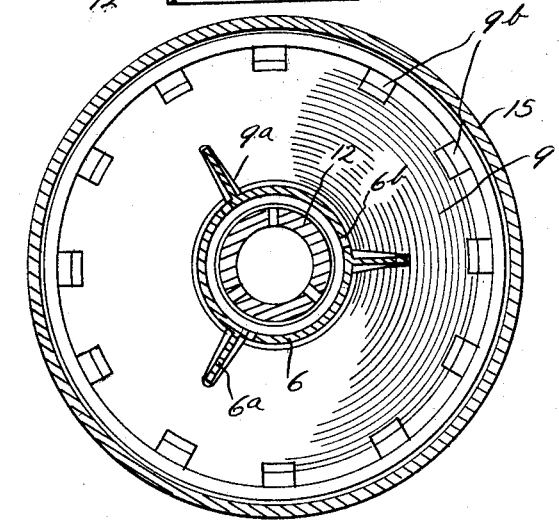
INVENTOR
Otto A. Krenke
BY
Swan & Frye
ATTORNEYS Patented Mar. 29, 1932

1,851,674

UNITED STATES PATENT OFFICE

OTTO A. KRENKE, OF PORT HURON, MICHIGAN, ASSIGNOR TO ANKER-HOLTH MANUFACTURING COMPANY, OF PORT HURON, MICHIGAN, A CORPORATION OF SOUTH DAKOTA

MEANS FOR MOUNTING ROTATABLE BODIES

Application filed May 29, 1930. Serial No. 456,747.

This invention relates to means for mounting rotating bodies, such as, for example, the drums of centrifugal machines, and has for its primary object the provision of simple and effective means whereby the rotating bodies may automatically balance themselves and rotate steadily despite changes in their centers of gravity or axes of rotation.

It has long been a desideratum among manufacturers and users of rotating bodies, and particularly centrifugal machines such as cream separators, to provide drums wherein the centers of gravity and axes of rotation would remain substantially constant, but since the drum of a cream separator comprises a plurality of parts which must be periodically separated, cleansed and restored, it has been found practically impossible to arrange for the continued uniformity in the arrangement of such parts. Moreover, during the separating action, the heavier particles have a tendency to collect in such a manner as to change the centers of gravity or axes of rotation of the rotating drum, and provision must be made to allow for such changes during rotation of the drum. One of the objects of the present invention is to provide means for mounting the rotating bodies so that they can automatically shift while rotating, within the predetermined limits, and rotate steadily both before and after such automatic shifting.

A further object of this invention is the arrangement of an outwardly extending circular flange upon a central shaft for co-action with an inwardly extending annular flange arranged upon the hollow central shaft or bore of the rotating body, the annular flange being arranged substantilly at the center of gravity of the rotating body and normally having its lower surface resting upon the upper surface of the circular flange. When both the shaft carrying the circular flange and the body carrying the annular flange are rotating, the body may tilt relatively to the shaft or shift laterally to permit steady rotation of the rotating body despite the changes in its center of gravity or axis of rotation.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a central vertical section through the major portion of a cream separator drum and casing, with the rotating members shown in full lines in the position assumed when not rotating.

Figure 2 is a detail elevation of the hollow central shaft thereof.

Figure 3 is a similar view of the tubular bore of the rotating drum.

Figures 4 and 5 are horizontal sections taken substantially upon the lines 4—4 and 5—5 of Figure 1, and Figure 6 is a detail plan view of the means for securing the casing parts in position.

Referring now to the drawings, the numeral 5 designates a rotating body, to-wit, the drum of a centrifugal cream separator, provided with a tubular central shaft or bore 6 having an inwardly extending annular flange 7 arranged substantially at the center of gravity of the rotating body, and with its lower surface at substantially right angles to the inner periphery of the tubular bore 6. This drum may be of any desired construction, and is herein illustrated as comprising a frusto-conical bottom member 8 supporting a plurality of separator discs 9 which are secured in their desired positions by suitable means such as the cover plate 10 and clamping nut 11 secured upon the threaded upper extremity of the tubular bore 6. The separator discs 9, when in use, are stacked one upon the other substantially as shown in Figure 1, and preferably are frusto-conical in shape and provided with a plurality of circumferentially spaced radial notches $9^a$ adjacent their inner peripheries and with a plurality of circumferentially spaced notches $9^b$ adjacent their outer peripheries to provide for ready passage of the separated cream and milk elements, in the usual manner of cream separators. The radial notches $9^a$ fit over a plurality of radially extending wings $6^a$ on the tubular bore 6, whereby the separator discs are positively driven to rotate with the central bore 6 of the drum. The central bore 6 is also provided with a plurality of spaced apertures 6ᵇ in the usual manner of cream separators. Extending through the tubular bore 6 is a hollow drive shaft 12 formed intermediate its ends with an outwardly extending circular flange 13, the upper surface of which is arranged at substantially right angles to the periphery of the shaft 12 and adapted to support the lower surface of the inwardly extending flange 7 of the rotating body. The hollow drive shaft 12 is formed with the usual or any desired arrangement of spaced radial openings 12ᵃ and 12ᵇ for the passage of portions of the milk or other liquid being separated. In the illustrated embodiment, the drive shaft 12 is carried by the outer casing of the separator, being secured to the frusto-conical base 14, upon which rests the substantially cylindrical casing 15 of the separator, the casing being clamped in position upon the base 14 by suitable means, such as the clamping nut 16 secured upon the threaded upper extremity of the shaft 12. It is to be noted that the rotary drum 5 is not secured to the casing or the central shaft 12 thereof except by the frictional resistance offered between the contacting surfaces of the annular flange 7 of the drum and cylindrical flange 13 of the casing shaft. The weight of the drum tends to maintain the drum firmly upon the flange 13 of the shaft and impart rotative movement to the drum because of the frictional resistance offered by the contacting surfaces of the flanges. However, the drum is free to tilt within the casing or shift laterally relatively to the central shaft 12, within the limits allowed by the mounting of the drum within the casing. As shown in dotted lines in Figure 1, the tilting of the drum will raise a portion of the annular flange 7 away from the circular flange 13, but the tilting movement is limited by contact of the drum with the casing. Obviously the limiting means may be either adjacent the top of the drum to first engage the base 14 of the casing, and any desired extent of tilting movement may be secured by appropriately spacing the normal positions of the members intended for limiting contact. Also the drum 5 is permitted to shift laterally of the shaft 12 regardless of tilting as far as is allowed by the spacing between the outer edge of the flange 13 and the inner periphery of the tubular bore 6, or by the spacing of the inner edge of the annular flange 7 and the outer periphery of the central shaft 12.

In operation, the central drive shaft 12 is suitably rotated, as by a spindle fitting snugly within or secured to the central shaft, and the rotation of the central shaft is communicated to the drum only through the contacting flanges 7 and 13. While the central shaft 12 must continue to rotate in substantially its initial plane, because of its mounting upon the spindle, the drum 5 may move relatively to the central shaft 12 to permit it to automatically balance itself during changes in its center of gravity or axis of rotation. In practice, it has been found that the drum will wobble slightly as it gathers speed, and then when its rotation has reached a suitable speed, it will rotate steadily, though in such rotation it may be tilted relatively to the central shaft. The faster the rotation of the drum, the steadier it seems to run, and changes in its center of gravity due to relative changes of separator discs in reassembling them, collection of particles that are being separated, etc., etc., will result merely in a tilting to a different angle or a lateral shifting of the annular flange 7 upon the circular flange 13 until a suitable balance is automatically secured. After the separating operation has been carried on as long as desired the rotation of the central drive is stopped, and as the speed of the moving members diminishes the drum 5 will again settle toward the position shown in full lines in Figure 1, with the annular flange 7 engaging the circular flange 13 throughout its entire circumference.

It is to be understood that the illustrated embodiment of my invention is merely for the purposes of exemplification, and that the invention is adapted to other uses than in cream separators.

Having described my invention, what I claim is:

1. Means for mounting a rotatable body comprising a rotatable central shaft having an outwardly extending circular flange and a rotatable body encompassing the central shaft and provided with an inwardly extending annular flange, the lower surface of the annular flange resting upon the upper surface of the circular flange of the shaft, and the outer flange and hollow shaft being sufficiently larger than the inner flange and shaft to permit their limited independent movement.

2. Means for mounting a rotatable body comprising a rotatable central shaft having an outwardly extending circular flange and a rotatable body encompassing the central shaft and provided with an inwardly extending annular flange, at substantially its normal center of gravity, the lower surface of the annular flange resting upon the upper surface of the circular flange of the shaft, and the outer flange and hollow shaft being sufficiently larger than the inner flange and shaft to permit their limited independent movement.

3. Means for mounting a rotatable body comprising a rotatable central shaft having an outwardly extending circular flange, with its upper surface at substantially right angles to the periphery of the shaft, and a rotatable body having a hollow shaft encircling and spaced from the central shaft and provided with an inwardly extending annular flange with its lower surface at substantially right angles to the inner periphery of the hollow shaft, larger than the first mentioned flange on the central shaft and adapted to contact the upper surface of the same and thereby limitedly movable relatively thereto.

4. Means or mounting a rotatable body comprising a rotatable central shaft having an outwardly extending circular flange, with its upper surface at substantially right angles to the periphery of the shaft, and a rotatable body having a hollow shaft encircling the central shaft and provided with an inwardly extending annular flange arranged at substantially the normal center of gravity of the body, with its lower surface at substantially right angles to the inner periphery of the hollow shaft, and adapted to contact the upper surface of the flange on the central shaft, the outer flange and hollow shaft being sufficiently larger than the inner flange and shaft to permit their limited independent movement.

5. In a device of the character described, a central shaft adapted to be rotated on substantially a vertical axis and provided with an outwardly extending circular flange, and a drum having a tubular bore encompassing and normally spaced from the central shaft and provided with an inwardly extending annular flange larger than but overlapping and adapted to rest upon the circular flange of the central shaft, whereby the drum may be frictionally driven by the central shaft, the outer flange and hollow shaft being sufficiently larger than the inner flange and shaft to permit their limited independent movement.

6. In a device of the character described, a central shaft adapted to be rotated on substantially a vertical axis and provided with an outwardly extending circular flange, with its upper surface at substantially right angles to the periphery of the shaft, and a drum having a tubular bore encircling the shaft and provided at substantially its normal center of gravity with an inwardly extending annular flange having its lower surface at substantially right angles to the periphery of the bore and adapted to rest upon the upper surface of the circular flange and shaft, the inner diameter of the annular flange being of greater diameter than the shaft to permit tilting or lateral movement of the drum relatively to the shaft.

In testimony whereof I hereby sign this specification.

OTTO A. KRENKE.